(12) United States Patent
Milligan et al.

(10) Patent No.: US 10,499,667 B2
(45) Date of Patent: Dec. 10, 2019

(54) FOOD PACKAGE INSERT FOR PRESERVING FRESHNESS AND METHOD OF MANUFACTURE

(71) Applicant: PRACTICAL APPLICATIONS, LLC, Germantown, MD (US)

(72) Inventors: Glenn W. Milligan, Myrtle Beach, SC (US); Roxanne Jackson, Olympia Fields, IL (US); Richard A. Frederick, Myrtle Beach, SC (US)

(73) Assignee: Practical Applications, LLC, Germantown, MD (US)

( * ) Notice: Subject to any disclaimer, the term of this patent is extended or adjusted under 35 U.S.C. 154(b) by 0 days.

(21) Appl. No.: 14/093,323

(22) Filed: Nov. 29, 2013

(65) Prior Publication Data

US 2015/0150286 A1    Jun. 4, 2015

(51) Int. Cl.
| | | |
|---|---|---|
| *A23L 3/3427* | (2006.01) | |
| *D04H 1/488* | (2012.01) | |
| *B65D 81/26* | (2006.01) | |
| *B32B 5/26* | (2006.01) | |
| *B32B 7/12* | (2006.01) | |
| *B32B 5/06* | (2006.01) | |

(52) U.S. Cl.
CPC .............. *A23L 3/3427* (2013.01); *B32B 5/06* (2013.01); *B32B 5/26* (2013.01); *B32B 7/12* (2013.01); *B65D 81/266* (2013.01); *D04H 1/488* (2013.01); *B32B 2262/062* (2013.01); *B32B 2307/724* (2013.01); *B32B 2307/726* (2013.01); *B32B 2439/70* (2013.01); *B65D 2585/366* (2013.01); *Y10T 428/14* (2015.01)

(58) Field of Classification Search
CPC ..... A43B 17/102; A43B 17/18; B32B 29/005; B32B 29/02; B32B 5/26; B32B 27/10; B32B 27/12; A01K 1/0107; A47K 3/002; A47D 1/00; A47G 27/0206; B65D 81/264; B65D 81/3461; B65D 81/3453; Y10T 428/14
See application file for complete search history.

(56) References Cited

U.S. PATENT DOCUMENTS

| | | | |
|---|---|---|---|
| 2,994,404 A | | 8/1961 | Schifferly |
| 4,644,592 A | * | 2/1987 | Small ............................... 4/583 |
| 4,684,562 A | * | 8/1987 | Hartkemeyer ................ 428/182 |
| 4,800,677 A | * | 1/1989 | MacK ........................... 119/171 |

(Continued)

*Primary Examiner* — Patricia L. Nordmeyer
(74) *Attorney, Agent, or Firm* — Fraline J. Allgaier

(57) ABSTRACT

A vapor-absorbing insert for non-ventilated delivery containers comprising a first and second layers of highly absorbent cotton fiber, and a third absorbent layer (which faces downward toward the food) having an applied layer of adhesive protected by a removable release layer which, when removed, exposes the adhesive for contact with the underside of the lid of a non-ventilated delivery container. The insert is pressed into a continuous laminated composite strip. The several layers may be bonded by pressure-induced interaction between the fibers of adjoining layers, and/or by adhesive fusing at their peripheral edges, and/or by spaced perforations which intertwine fibers between adjoining layers, after which the bonded layers are cut to shape. In use, upon peeling off the peelable anti-stick sheet, the element self-adheres to the underside of the food container lid.

10 Claims, 3 Drawing Sheets

(56) References Cited

U.S. PATENT DOCUMENTS

| | | | |
|---|---|---|---|
| 4,935,282 A * | 6/1990 | Pawlowski et al. | 428/121 |
| 4,950,524 A * | 8/1990 | Hacker | 428/163 |
| 5,093,176 A * | 3/1992 | Pribonic et al. | 428/76 |
| 5,385,292 A | 1/1995 | Labianca et al. | |
| 5,404,808 A | 4/1995 | Smith et al. | |
| 5,454,471 A | 10/1995 | Norvell | |
| 6,177,164 B1 * | 1/2001 | Sullens et al. | 428/40.1 |
| 6,274,229 B1 * | 8/2001 | Weidner et al. | 428/213 |
| 6,932,267 B2 | 8/2005 | Potenza, Jr. et al. | |
| 7,005,035 B2 | 2/2006 | O'Neill et al. | |
| 7,249,570 B1 * | 7/2007 | Roberson | 119/169 |
| 2002/0071924 A1 * | 6/2002 | Lopez-Valverde | 428/40.1 |
| 2004/0157051 A1 * | 8/2004 | Trent et al. | 428/327 |
| 2004/0213937 A1 * | 10/2004 | Arthur | 428/40.1 |
| 2005/0008853 A1 * | 1/2005 | Foote | 428/343 |
| 2008/0050554 A1 * | 2/2008 | Toonen et al. | 428/99 |
| 2010/0047405 A1 * | 2/2010 | Versteylen et al. | 426/124 |
| 2012/0148778 A1 * | 6/2012 | Dawkins | 428/40.1 |
| 2013/0015084 A1 * | 1/2013 | Farrell et al. | 206/216 |
| 2013/0078405 A1 * | 3/2013 | Schryver | 428/40.1 |

\* cited by examiner

FOOD PACKAGE INSERT FOR PRESERVING FRESHNESS AND METHOD OF MANUFACTURE

FIELD OF THE INVENTION

The present invention relates generally to a package for preserving the freshness of food, particularly hot food as served by take-out and/or delivery restaurants. More specifically the present invention is a vapor trap which, when inserted into a conventional hot food package, serves to protect and maintain the original flavor, crispness, texture, and appearance of the hot food, particularly while being transported in unventilated packages.

The present invention also relates to devices made of natural cellulosic fibers and similar material which are capable of absorbing and retaining water in its various physical states, including steam, water vapor and condensed moisture.

BACKGROUND OF THE INVENTION

Protecting the freshness of food is essential to restaurants, especially those specializing in customer delivery and take-out orders. Containers normally used for such purposes are constructed of cardboard, hard plastic, molded foam, heavy paper, or similar disposable and/or recyclable material. Such containers are generally unventilated, which results in the degradation of food, particularly loss of freshness, undesirable changes in flavor, diminished visual appeal, and in particular a tendency of hot baked or fried items to lose their crispness, and becoming soggy and unappetizing. This invention was therefore created to specifically address what is recognized by the carryout and delivery pizza industry as its number one consumer complaint: a once-fresh and crisp product which, upon delivery, is found to have a soggy, gummy, rubbery crust. This is because the quality, texture, taste, crispness, and appeal of fresh-baked pizzas deteriorate rapidly inside an unventilated transport box or container. The moment that a piping-hot pizza goes into a box and the lid is closed, the heat of the product within the box creates a literal "rain storm" of unwanted water vapor. In just a few minutes, irreparable damage can be done to the product inside.

A SUMMARY OF THE INVENTION

When affixed to the bottom side of the lid of a carryout or delivery container, the package insert of the present invention presents an absorbent surface which faces down directly above the hot food. The insert's first layer of smooth exterior extremely fine cotton cellulosic fibers maximizes the overall surface area exposed to damaging airborne water vapor generated by the hot food. The unique properties of this material insures optimal attraction of airborne vapors, and also maximizes the absorption and rapid transfer of water and other vapors into succeeding layers of the insert for permanent retention away from the food.

In addition to attracting, capturing, and retaining vapors released by hot pizza and other baked food items, the improved package insert of the present invention has another valuable, ancillary attribute. Hot fried foods (e.g., fried chicken, fried fish, French fries, etc.) in carryout and delivery containers also tend to generate and release small but significant amounts of vaporized cooking oil. Unlike water, cooking oils are made of complex strings of molecules, which are also collected and retained by the invention, along with the water vapor. Otherwise, this airborne cooking oil would tend to combine into clusters and then sink back onto the fried food. Without the advantages provided by the invention, this combination of destructive water vapor and cooking oil tends to permanently alter and degrade the appearance, taste, crispness, and appeal of these popular fried foods.

When affixed to the bottom side of a carryout or delivery container's lid, the exterior surface of the invention's first layer is facing down and directly above the hot food. The extremely fine cotton cellulosic fibers that comprise the smoothed, exterior first layer are specifically selected to maximize the overall surface area exposed to the damaging airborne water vapor generated by the hot food. Thus, these unique properties insure optimal attraction of the airborne water vapor by the first layer promotes maximum absorption, and rapid transfer into the invention's successive layers for permanent retention away from the food.

The invention is designed and constructed to attract, absorb, transfer and retain airborne moisture generated by hot food inside a closed, non-ventilated transport box or container. By doing so, the invention protects the original appearance, taste, texture, and quality of the food product. Otherwise, water vapor would cause irreversible damage to the food product, especially portions such as baked or fried crusts.

OBJECTIVES OF THE INVENTION

It is therefore a principal object of the present invention to prevent degradation of hot food due to re-absorption of moisture generated within the food container itself, and to provide a means of absorbing such moisture in a vapor trap. This the inventors have found is effective to protect and maintain the original flavor, crispness, texture, and appearance of hot food while being transported inside covered, unventilated boxes, cartons, bowls, or similar containers.

A related object of the invention is to provide an improved environment for transporting hot foods by absorbing and retaining the moisture generated by such foods. To accomplish this end, it is an object to provide an inexpensive and effective vapor trap capable of attracting, capturing, absorbing, transferring and retaining undesirable moisture generated by hot food inside a closed container. Further, the invention is designed in a manner to facilitate this process in an accelerated manner to successfully address the highly time-sensitive nature of the problem. It is also an object of the invention to provide an insert for closed hot food containers which prevents such moisture from condensing and accumulating and thereby altering the food product inside.

A further related object of the invention to provide an insert for hot food containers which absorbs and retains vaporized cooking oils discharged from such foods, and preventing them from congealing and dripping back onto the food product.

It is a further object of the invention to provide such a container which is inexpensive and amenable to efficient waste management by employing fully biodegradable materials.

Finally, it is also an objective of the invention to further the objectives of efficient waste management by being constructed with "green" materials, meaning that they are fully biodegradable and compostable with known technologies.

DETAILED DESCRIPTION OF THE INVENTION

Figure 1:
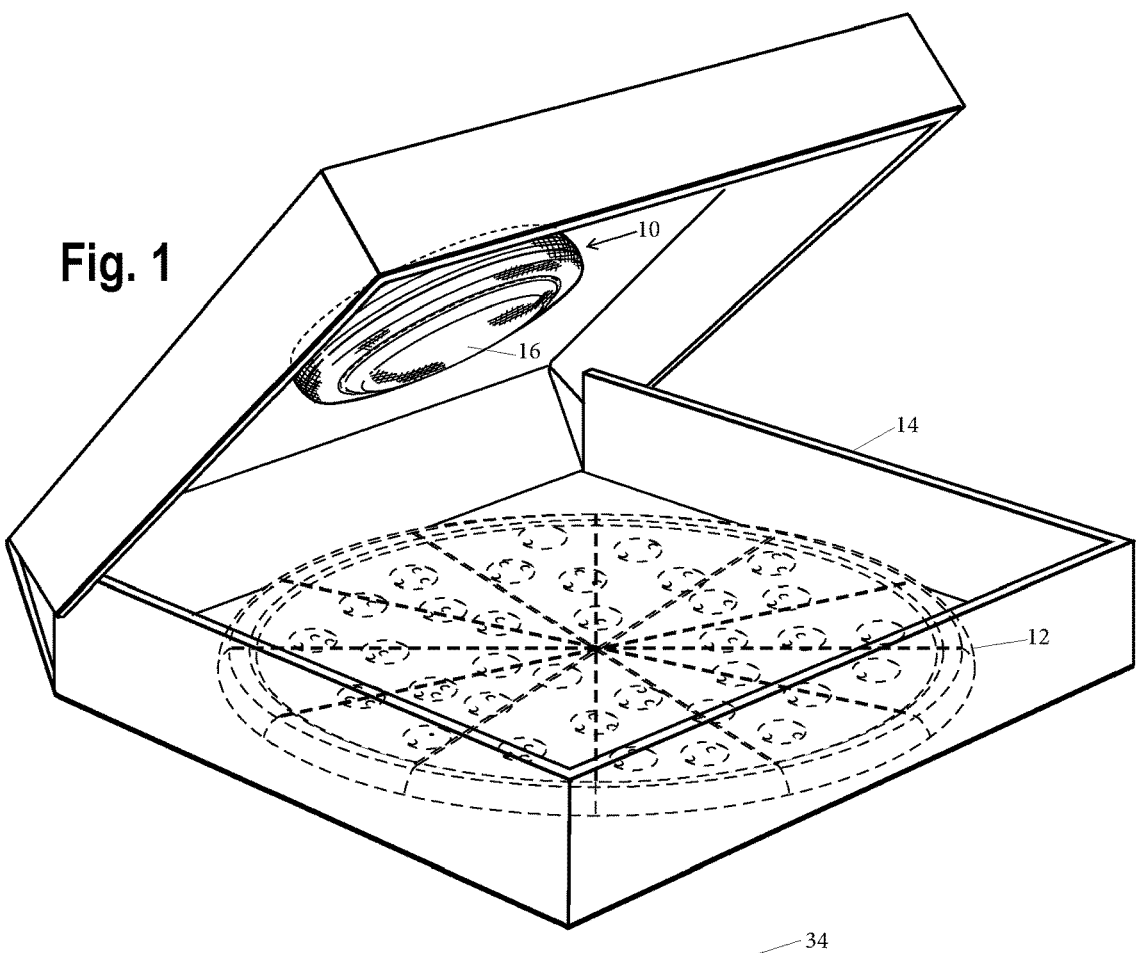
FIG. 1 is a front perspective view of a fresh pizza in a box incorporating the vapor absorbing element of the present invention.
Figure 2:
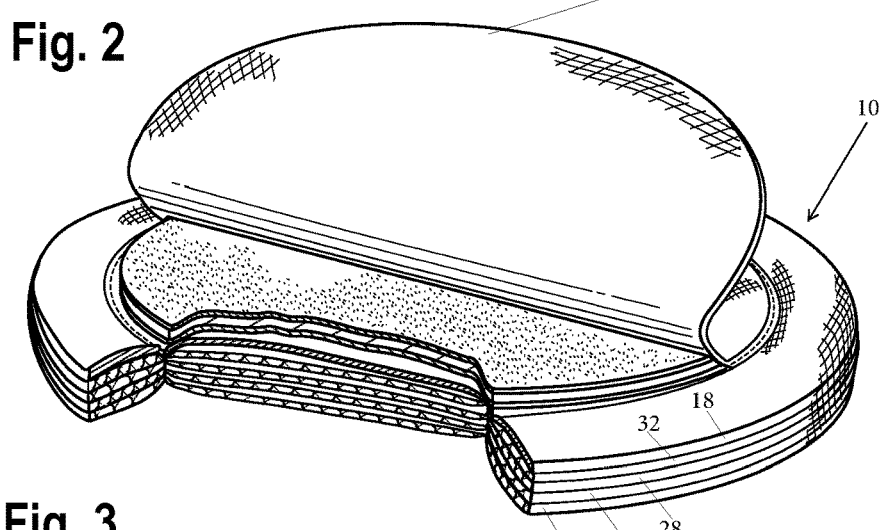
FIG. 2 is a front cut-away perspective view of the vapor trap insert of FIG. 1, showing its double sided adhesive sheet exposed by the partial lifting of a release coated protective shield.
Figure 3:
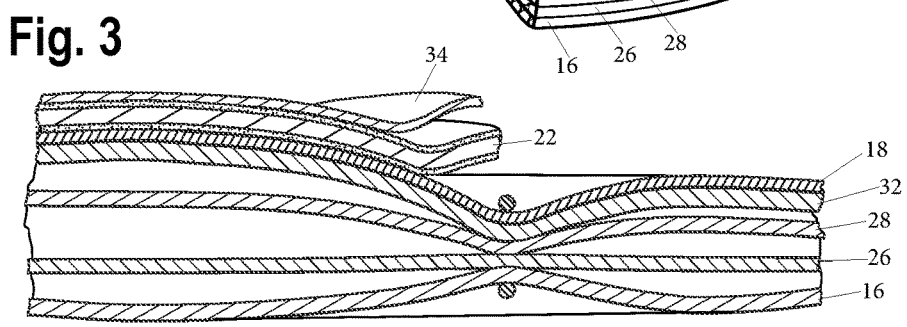
FIG. 3 is a side cross-sectional elevation of the insert of FIG. 2.
Figure 4:
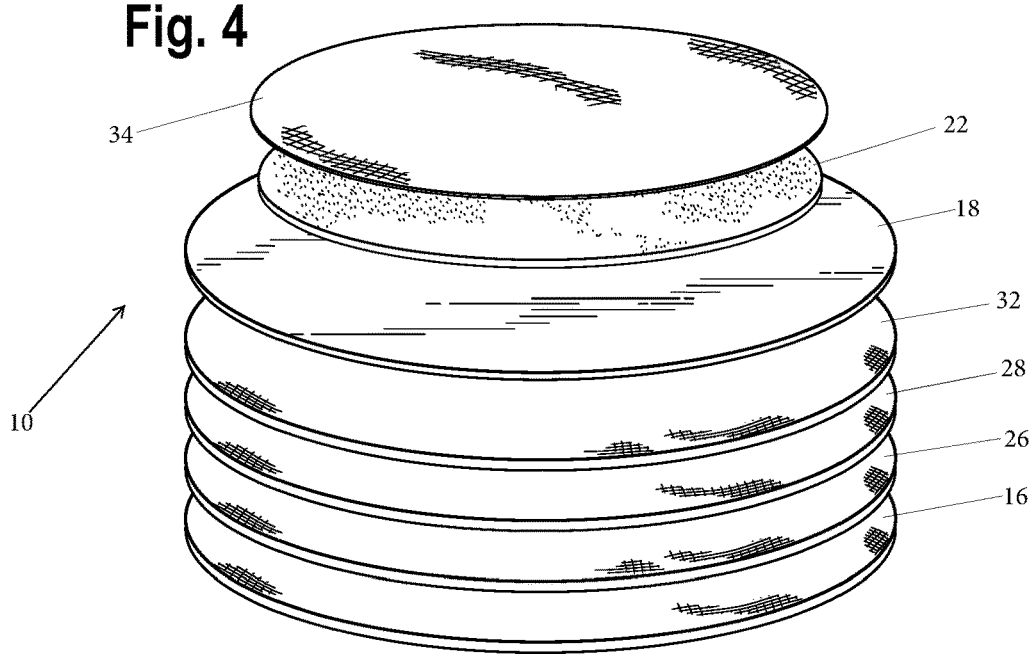
FIG. 4 is a front exploded perspective view of the assembled insert of FIG. 2 prior to being bonded into an integral unit.

Turning to the drawings, FIGS. 1-3 illustrate a first embodiment of the improved vapor trap 10 of the invention, which in the illustrated embodiments consists of a non-ventilated delivery container 14 containing a vapor trap 10 comprising plurality of layers of specialized moisture absorbent material forming a single pad or insert which absorbs and retains both moisture and cooking oil vapors to prevent them from condensing and falling back on to the hot food 12, and having a double-sided adhesive sheet 22, exposed by removing a peelable anti-stick sheet 34, allowing quick attachment to the underside of the non-ventilated delivery container 14.

The food-facing layer 16 of this embodiment (which in use would face downward, toward the hot food 12) is preferably of liquid-absorbent cellulosic material such as cotton which is combed and/or smoothed to present an exterior surface which maximizes the amount of absorbent fibers exposed to the airborne water vapor. The second layer 26 and third layer 28 are also of liquid-absorbent cellulosic material such as cotton and have relatively coarse, unsmooth surfaces layered to thicknesses of 2 mm and 3 mm respectively. The fourth layer 32 is a compressed and compacted layer, also of cellulosic material such as cotton, with coarse fibers facing the previous layers and a smooth opposite side. To this smooth front side is affixed the vapor-impermeable layer 12 to prevent moisture from compromising the strength and adhesive properties of the contiguous surface of the double-sided adhesive sheet 22. To this vapor-impermeable layer 18 is affixed the double-sided adhesive sheet 22. One adhesive side of the double-sided adhesive sheet 22 attaches the vapor-impermeable layer 18 during manufacture, and the other is protected by a peelable anti-stick sheet 34 which is removed just prior to use, thereby allowing the device to be self-adhered to the underside of the non-ventilated delivery container 14 lid.

The vapor trap 10 of the invention is preferably a disc approximately 120 mm in diameter. As best shown in FIGS. 2 and 3, this embodiment comprises four absorbent layers, one vapor-impermeable layer, and one attachment layer protected by peelable anti-stick sheet 34, stacked vertically in a certain preferred order of fiber size properties, density, thickness, and functionality (as further described below), which layers are then affixed together by suitable means into a single disc insert or element, ready to apply to the underside of a non-ventilated delivery container 14 lid. Additional absorbent layers may be employed without departing from the invention.

Figure 5:
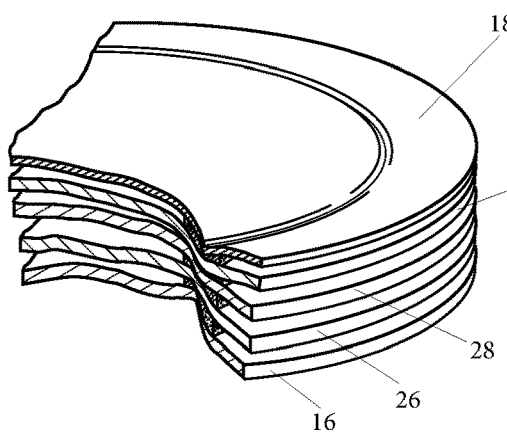
FIG. 5 is a front cutaway perspective view of the insert of FIG. 4 after being bonded into an integral unit.
Figure 6:
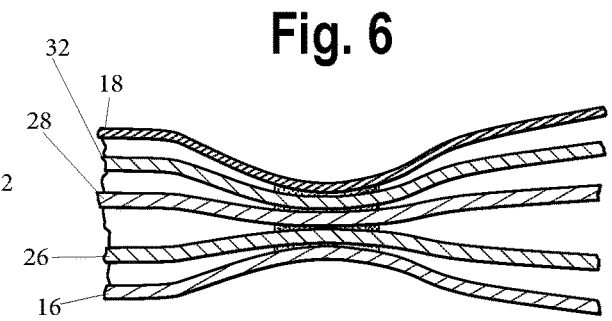
FIG. 6 is a side cross-sectional elevation of the insert of FIG. 5.
Figure 7:
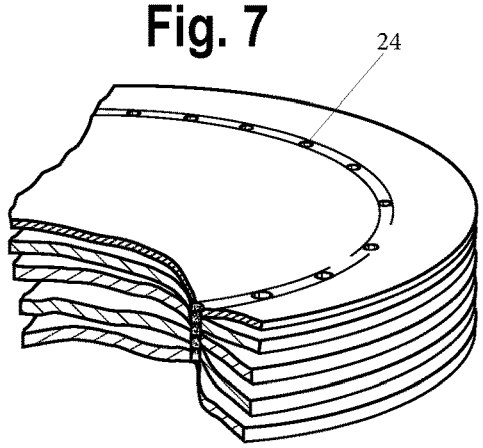
FIG. 7 is a side cross-sectional elevation similar to FIG. 5.
Figure 8:
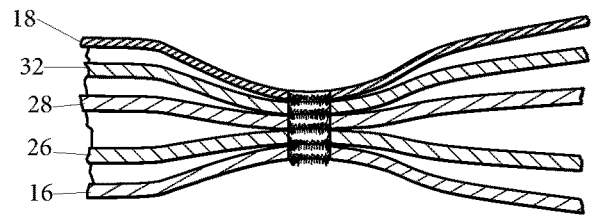
FIG. 8 is a side cross-sectional elevation of the insert of FIG. 7.

In addition to affixing the layers around the circumference of the 120 mm diameter vapor trap 10 insert by suitable means, including but not limited to stitching (FIGS. 2-3) and adhesive bonding (FIGS. 5-6), a pattern of additional attachment points consisting of perforations 24 (FIGS. 7-8) spaced approximately around the periphery of the vapor trap 10 (FIG. 7), or in spaced rows across the entire surface of the vapor trap 10 (not shown). Each of these attachments or bonding means assures that the multiple layers of absorbent material of the vapor trap 10 maintain contact with each other to facilitate the desired water transfer and storage, as well as prevent the possibility of these specific vapor disc layers from separating and drooping down as water and/or cooking oil vapors are accumulated within.

According to the invention, the peelable anti-stick sheet 34 of the vapor trap 10, being the upward-facing side of the assembled vapor trap 10 which when inverted in use attaches to the underside of the lid of a non-ventilated delivery container 14, is treated with a layer of FDA-approved adhesive. This adhesive surface is covered by an easily removable protective release layer such as waxed paper, which is then removed before use to allow the assembled vapor trap 10 to be quickly and easily affixed to the underside of the lid of a non-ventilated delivery container 14, either before or after the hot food 12 is inserted.

After being adhesively affixed to the underside of the lid of the non-ventilated delivery container 14, the food-facing layer 16 of the vapor trap 10 now faces downward towards the hot food 12 in the non-ventilated delivery container 14. This is the optimal position to effectively attract, capture, transfer and store the resultant, naturally rising water vapor and vaporized cooking oils. The food-facing layer 16, which faces downward in use, is approximately 2 mm thick. This layer is composed of medium length (dry condition), non-treated cotton fibers having average elongation (wet condition). Its external or food-facing surface is comprised of fine, smoothed cotton fibers. The smoothing process allows the vapor disc's 10 surface fibers to relax and open to insure the maximum amount of water vapor and/or vaporized cooking oil is rapidly drawn inside. The smoothed cotton fibers quickly pass the captured molecules into the core of this layer, creating larger molecule clusters. The cotton fibers on the front side or back side of the food-facing layer 16 are left in their naturally coarse condition to optimally interact with the front side of the second layer 26 to quickly transfer the collected moisture and/or vapor. This unique, ongoing transfer process of the captured vapors to the front side of the second layer 26 continually "renews" the ability and capacity of the food-facing layer 16 to attract and capture additional vapor as it is generated by the hot food 12.

The second layer 26 and the third layer 28 are preferably comprised of non-treated cotton fibers that are medium length (dry condition), and are of average fineness average elongation (wet condition). These layers are ideally compressed or compacted to a thickness of approximately 2 mm to 3 mm. This third layer 28 is firmly pressed against the back side of the food-facing layer 16 for maximum fiber to fiber) interaction. The third layer 28 is then firmly pressed against the back side of the second layer 26 to insure continued optimal fiber-to-fiber interaction. This insures that the second layer 26 and the third layer 28 will rapidly draw away the vapor molecules collected from the food-facing layer 16 and rapidly transfer them deeper inside the vapor trap 10 for collection and retention in a fourth layer 32 and any additional liquid-absorbent layers which may be optionally added without departing from the invention.

The following fourth layer 32 is preferably made of non-treated cotton fibers that are long length (dry condition), average fineness and average elongation (wet condition). This layer of the vapor trap 10 is optimally compressed to approximately 2 mm thick. The coarse, unsmoothed fibers on the front side of the fourth layer 32 this is adjacent to the third layer 28 pull away accumulated condensed vapor from the back side of the third layer 28. Most of the condensate collected by the third layer 28 is immediately transferred onto the fourth layer 32.

However, the third layer's 28 additional thickness is specifically designed to also function as an "over-flow" collection area in the event the fourth layer 32 becomes fully saturated with condensed liquid. The opposite or back side of the fourth layer 32, facing towards and adjacent to the vapor-impermeable layer 18, is characterized by fibers with a combed or smoothed surface. This insures that the maximum possible number of fibers are available for water vapor retention and storage and in the fourth layer 32, the final layer of absorbency of the vapor trap 10.

The fourth layer 32 is comprised of non-treated cotton fibers that are long length (dry condition), coarse, and average elongation (wet condition). The fourth layer 32 is ideally approximately 2 mm thick. The specific purpose of the fourth layer 32 of the vapor trap 10 is to collect and store the transferred condensed vapors as far away as possible from the food-facing layer 16 and the hot food 12 in the non-ventilated delivery container 14. This is followed by the vapor-impermeable layer 32 to keep accumulated moisture from compromising the strength and adhesive properties of the contiguous surface of the double-sided adhesive sheet 22. The double-sided adhesive sheet 22 is preferably a disk coated on both sides with an FDA-approved adhesive which is affixed to the assembled stack of discs. The upper side exterior surface of the assembled vapor disc is a cover sheet of non-stick, releasable or peelable material (such as waxed paper) to protect the adhesive on the double-sided adhesive sheet 22 until it is removed for use.

Without such a vapor trap 10, the food within such closed transport containers, particularly hot food 12, is exposed to and absorbs water and other vapors expelled from the food itself. As a result, the quality of the food is dramatically and irreversibly altered. Usually, this degradation includes loss of freshness, adverse change in original flavor and aroma, diminished visual appeal, and loss of the highly desirable crisp texture of certain foods which can become soft and soggy. Foods especially vulnerable to this objectionable degradation of quality include fried foods (e.g. fried chicken, fish, vegetables, French fries, etc.) and baked items (e.g. pizza crust, bread, pastries, etc.). The preferred embodiments of the invention have the following characteristics:

Size: The standard size is approximately 120 mm in diameter by 10 mm thick.

Material: Made from 100 percent organic cotton conforming to ISO 9001 certification standards.

Attachment: An adhesive layer on the back side of the peelable anti-stick sheet 34 allows the vapor trap 10 to be easily attached to the inside of the lid or top of a non-ventilated delivery container 14 before the hot food 12 is inserted. As previously described, this adhesive layer is protected by a non-adhering peelable anti-stick sheet 34 of non-stick releasable or peelable paper or other similar material which is removed prior to attachment of the invention to the inside of a lid or top of an associated non-ventilated delivery container 14.

Figure 9A:
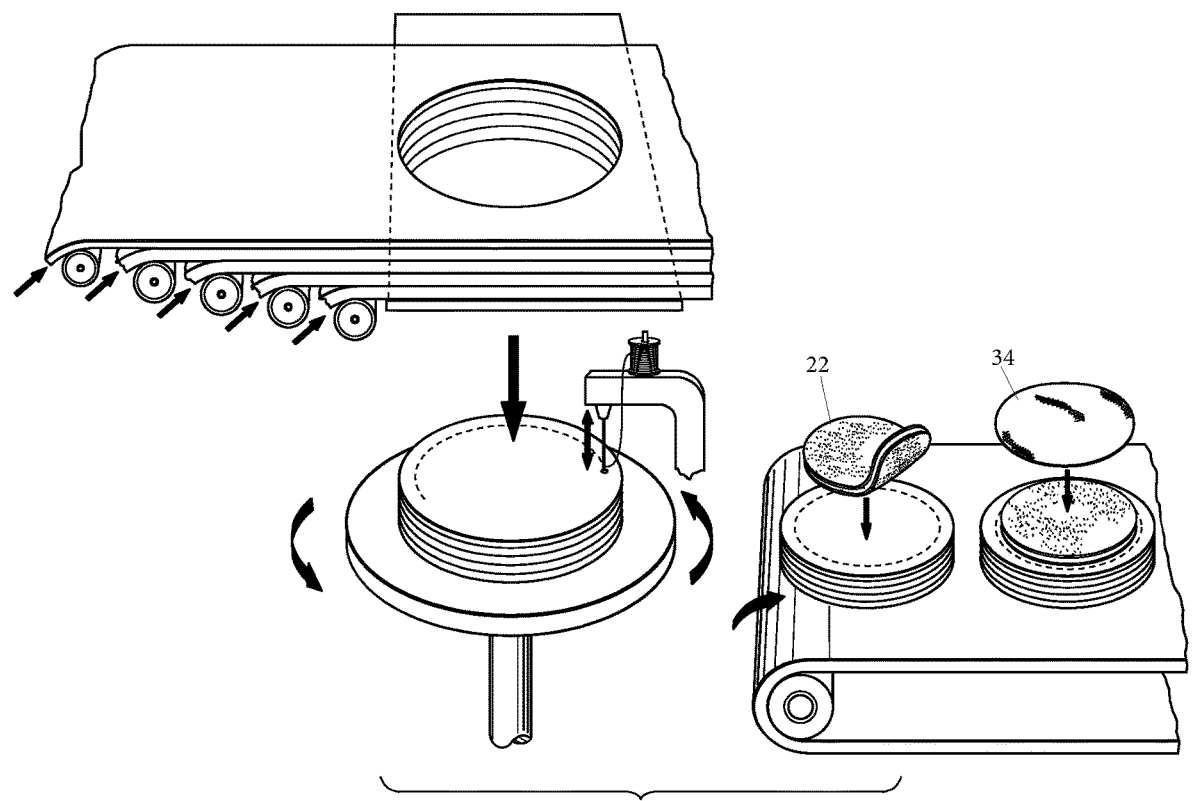
FIG. 9A is a schematic representation of the first embodiment of the invention illustrated in FIGS. 2 and 3.

In the illustrated embodiments, the top and bottom edges of the stacked layers 1 and 4 along with the vapor-impermeable layer 18 are preferably first bound together by high compression pressure, without the use of adhesives or other mechanical bonding means. At the same time the perforations 24 in the middle area may be pressure bonded to hold the several layers of material together. In FIGS. 1 and 2, the top-most food-facing layer 16 of cotton fiber is approximately 2 mm thick of general grade cotton. The next intermediate layer is a compacted coarse pressed cotton fiber approximately 2 mm thick. The third layer 28 is a compacted coarse cotton fiber approximately 3 mm thick. The fourth layer 32 is preferably a fine close weave of cotton fiber approximately 2 mm thick. The layers are stacked together (FIG. 9A), cut into disc shape, and then passed through a bonding process where the layers are bonded together at perforations 24 approximately 5 mm apart. The edges are then pressure sealed in a band approximately 4 mm all around the circumference of the vapor trap 10.

Optionally, instead of applying a sheet of double-sided adhesive with a peelable release surface, an adhesive compound is applied to the entire surface of the fourth layer 32, which is then protected by a similar layer of release material.

The adhesive compound preferably used has the following properties:

Material: Synthetic resins

Toxicity: none

Viscosity: approximately 9800 mPa·s at 125 degrees C. Again, the overall finished diameter of the insert is approximately 120 mm.

Figure 9B:
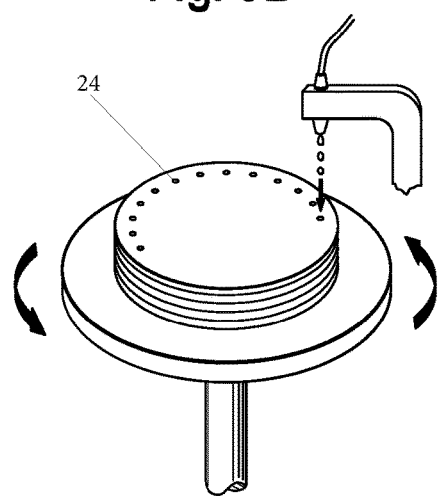
FIG. 9B is a schematic representation of the second embodiment of the invention illustrated in FIGS. 5 and 6.
Figure 9C:
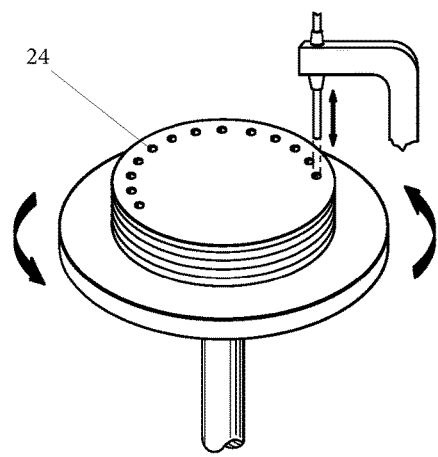
FIG. 9C is a schematic representation of a variation of the method of FIG. 9A used to manufacture the third embodiment of the invention illustrated in FIGS. 7 and 8.

In addition to compression binding of the several layers of absorbent material, other means may be used, including but not limited to a peripheral band of stitching (FIGS. 2, 3 and 9A), heat-activated adhesive (FIGS. 5, 6 and 9B), and spaced perforations (FIGS. 7, 8 and 9C) by which fibers from each layer are pushed through and intertwined with fibers in adjacent layers, thereby forming a mechanical bond between them.

Properties of the Preferred Materials

With many fibers and absorbent materials available for consideration as the primary component/material in the vapor trap 10, the inventors carefully considered their respective attributes in relation to their critical criteria of 1) molecular structure with scientifically proven attraction to water, 2) high water absorbency, 3) high water storage capacity per fiber, 4) existence of same-material fibers with multiple lengths, thickness, and textures yielding distinctive functionalities, 5) extremely rapid transfer of water from fibers to contiguous fibers, 6) rapid recovery of absorbency after transfer, 7) non-toxicity, 8) FDA-approved, 9) eco-friendly/bio-degradable, 10) availability, and 11) cost. Following this extensive research, cotton was the clear choice.

Water molecules are made up of one atom of oxygen joined to two atoms of hydrogen. Each oxygen atom has a negative charge, while the hydrogen atoms have a positive charge. This creates a magnetic or "dipolar" attraction that binds the atoms together into a water droplet and also allows water to bond with or attach to any adjacent molecules which contain an opposite charge, such as cotton molecules.

Unlike water molecules, cotton is made up of more complex series of atoms, which are linked into what are called "polymer molecules". These polymer molecules link up in repetitive patterns or chains, creating pure cellulose, a substance which makes cotton highly absorbent. The cellulose in cotton contains a negative charge that attracts "dipolar" water molecules and promotes rapid absorption. Part of the reason that cotton is so absorbent lies in the reaction of the differing molecular structures of cotton and water. This critical scientific attraction between cotton and water molecules is an essential attribute of the invention in accomplishing its mission of quickly and effectively attracting and removing airborne water vapor prior to damaging the food product in the non-ventilated delivery container 14.

The cellulose in cotton has what is referred to in chemistry as "hydrophilic properties". The word "hydrophilic" is derived from the Greek language and actually means "water loving" or "water attracting". A hydrophilic molecule, such as those that occur naturally in cotton cellulose, is the exact opposite of a "hydrophobic" or water repelling molecule. Hydrophobic molecules often are found in man-made fibers that are oil or petroleum based. This makes man-made fibers less likely to absorb moisture and unsuitable for use in achieving the objectives of the invention.

Cellulose is the structural component of the primary cell wall of green plants. The cellulose content of cotton fiber is 90%. Cotton is scientifically proven to be able to absorb up to 27 times its weight in liquid water. Its absorbent properties occur due to a number of reasons, including its specific molecular structure and its corresponding relationship to the molecular structure of water.

Another key feature of the invention's multiple-disc structure is the capillary action inherent in cotton. Cotton is recognized for possessing this highly desirable trait. Cotton fibers are therefore able to "draw" or "suck in" water like a straw through the interior of the fiber. Once drawn in through the fibers, the water is then stored in the interior cell walls. The multi-layer design of the invention uses a unique configuration of selected types and categories of cotton fibers (see Chart I) to rapidly attract and absorb airborne water vapor from within the closed, non-ventilated transport container, and quickly transfer and store it within the several internal vapor-absorbent layers. This continual transfer of the captured water away from the first vapor disc layer allows it to continue to attract and capture more airborne water vapor as it is generated by the hot food item.

It is important to note that time is of the essence in removing the airborne water vapor generated by the hot food item inside a closed non-ventilated delivery container 14. The irreversible damage to the hot food 12, especially the crispness, appearance, taste, and texture of pizza crust, happens very rapidly. Thus, merely removing the airborne water vapor inside the carryout/delivery transport box or container is not sufficient. The invention's unique design, capacity, and synergy accomplish this critical mission in a highly accelerated manner prior to degradation of the food's original quality.

The unique size, thickness, and selected combination of cotton fibers allows the packaging vapor trap 10 to attract, capture, and retain a volume of water several times greater than the maximum amount generated by typical pizzas, fried chicken, and other carryout and/or delivery foods. The invention will also be applicable for and very effective in removing damaging water vapor in other food service activities, such as catering. With larger quantities of food in larger transport containers or covered serving trays, a simple increase in the diameter of the invention's vapor-absorbing discs is all that would be required to maintain the same superior levels of performance.

In summary, the present invention comprises a package containing a vapor trap 10 comprised of a plurality of layers of materials bonded together to form a single moisture-absorbing unit which protects and maintains the original flavor, crispness, texture, and appearance of hot food while being transported in unventilated packages. Such containers are normally constructed of relatively non-absorbent cardboard, hard plastic, molded foam, or heavy paper. The vapor trap 10 helps to protect and maintain the original flavor, crispness, texture, and appearance of hot food while being transported inside covered, unventilated boxes, cartons, or bowls, typically used by restaurants for customer delivery and/or takeout orders.

Cotton Fiber Properties Grouped by Layer

The preferred components of the invention are as follows. The following fibers with their attendant properties were chosen by the inventors to drive the desired functionalities of the invention as a whole, as well as the interactivity between the individual layers of the vapor trap 10. (See Chart I below.)
First Layer: Medium Length (Dry), Fiber Elongation (Wet)—Average, Fiber Fineness—Fine;
Second Layer: Medium Length (Dry), Fiber Elongation (Wet)—Average, Fiber Fineness—Average;
Third Layer: Long Length (Dry), Fiber Elongation (Wet)—Average, Fiber Fineness—Average;
Fourth Layer: Long Length (Dry), Fiber Elongation (Wet)—Average, Fiber Fineness—Coarse.
Fifth Layer: Thin and impermeable, to protect the adhesive-coated attachment layer from degradation from absorbed moisture.
Sixth Layer: Commercially available double-sided adhesive sheet, protected on at least one side by a peelable anti-stick sheet 34 which when removed exposes the underlying adhesive for attachment to the underside of a box lid or other surface.
The inventors have examined the properties of many natural and man-made fibers and based on that research, selected cotton as the ideal moisture absorbent material.
Alternative fibers, such as man-made fibers, yield varying levels of undesirable water repellency. Other possible natural fibers, such as wool, jute, cashmere, flax, silk, ramie, and hemp, simply did not possess the full spectrum of superior characteristics offered by cotton. Further, other fiber options have additional limiting issues involving cost, availability, and/or abundance.

Since the invention is intended to be used in proximity to food, all of its vapor trap components are expected to be approved by the U.S. Food and Drug Administration (FDA).

It will be understood that the foregoing illustrations and description of the invention are for the purpose of describing a preferred embodiment of the invention and are not intended to limit the its scope. Although the invention has been explained in relation to its preferred embodiment, it is to be understood that many other possible modifications and

CHART I

| Ratings of Fiber Properties | |
|---|---|
| Upper Half Mean Length | |
| Below 0.99 | Short |
| 0.99-1.10 | Medium |
| 1.11-1.26 | Long |
| Above 1.26 | Extra Long |
| Fiber Elongation (%) | |
| Below 5.0 | Very Low |
| 5.0-5.8 | Low |
| 5.9-6.7 | Average |
| 6.8-7.6 | High |
| Above 7.6 | Very High |
| Uniformity Index | |
| Below 77 | Very Low |
| 77-79 | Low |
| 80-82 | Average |
| 83-85 | High |
| Above 85 | Very High |
| Length Uniformity Index (LUI) = 100 × Mean Length Upper Half Mean Length | |
| Fiber Fineness (millitex) | |
| Below 135 | Very Fine |
| 135-175 | Fine |
| 175-200 | Average |
| 200-230 | Coarse |
| Above 230 | Very Coarse |
| Fiber Maturity Ratio | |
| Below 0.7 | Uncommon |
| 0.7-0.8 | Immature |
| 0.8-1.0 | Mature |
| Above 1.0 | Very Mature |
| Fiber Strength | |
| (⅛-in. gauge strength in grams/tex) | |
| 20 and below | Very Weak |
| 21-25 | Weak |
| 26-29 | Base |
| 30-32 | Strong |
| 33 and above | Very Strong |

What is claimed is:

1. A vapor trap having a plurality of bonded layers and being used for trapping water vapor that is released when hot food is placed in a non-ventilated delivery container,
    a. said vapor trap comprising a food-facing layer, a second layer, a third layer, a fourth layer, a vapor-impermeable layer, a double-sided adhesive sheet, and perforations fixedly connecting said food-facing layer and said second layer, said third layer, and said fourth layer,
    b. said food-facing layer having outer peripheral edges, a front side, a back side, and being constructed from compacted liquid-absorbent cellulosic fiber, said compacted liquid-absorbent cellulosic fiber having an upper mean length of at least 0.99 mm, a thickness of at least 2 mm, a fiber elongation average percentage of at least 5.0 when said food-facing layer is wet, and an average fiber fineness of at least 135 millitex, said food-facing layer being faced above said hot food and thereby allowing said compacted liquid-absorbent cellulosic fiber to capture said water vapors released by hot foods, said compacted liquid-absorbent cellulosic fiber transporting said water vapors into said second layer, said third layer, and said fourth layer for permanent retention away from said hot food,
    c. said second layer having outer peripheral edges, a front side, a back side, and being constructed from a compacted coarse liquid-absorbent cotton fiber, said coarse liquid-absorbent fiber having an mean length of at least 0.99 mm, a thickness of at least 2 mm, a fiber elongation average percentage of at least 5.0 when said second layer is wet, and an average fiber fineness of at least 175 millitex, said second layer being fixedly pressed against said back side of said first food-facing layer to ensure continued interaction of said compacted coarse cotton fiber of said second layer with said compacted liquid absorbent cellulosic fiber of said first food-facing layer thereby allowing said water vapors to move upwardly into said third layer and away from said food-facing layer; said third layer having outer peripheral edges, a front side, a back side, and being constructed from a compacted coarse cotton fiber, said compacted coarse cotton fiber having an upper mean length of at least 0.99 mm, a thickness of at least 2 mm, a fiber elongation average percentage of at least 5.9 when said third layer is wet, an average fiber fineness of average of at least 175 millitex, and being fixedly pressed against the back side of said second layer to insure continued interaction of said compacted coarse cotton fiber of said third layer with said compacted coarse cotton fiber of said second layer and thereby allowing said water vapors to move upwardly into said third layer and away from said second layer, said water vapors becoming condensed vapors in said third layer; said fourth layer having outer peripheral edges, a front side, a back side, and being constructed from non-treated cotton fibers, said non-treated cotton fibers having an upper mean length of at least 1.11 mm, a thickness of at least 2 mm, a fiber elongation average percentage of at least 5.9 when said fourth layer is wet, an average fiber fineness of average of at least 200 millitex, and a compressed thickness of approximately 2 mm, said non-treated fibers on said front side of said fourth layer receiving said condensed vapor from said back side of said third layer,
    d. said vapor-impermeable layer having a front side and a back side, said vapor-impermeable layer protecting said double-sided adhesive sheet from said water vapors,
    e. said double-sided adhesive sheet having a front side and a back side, said front side of said double-sided adhesive sheet being affixed to said back side of said vapor-impermeable layer, said back side having a peelable anti-stick sheet being attached thereon, and said back side being attached to the inside upper lid of a non-ventilated container carrying said hot food once said peelable anti-stick sheet is removed.

2. The food-facing layer of claim 1 wherein said compacted liquid-absorbent cellulosic fiber is smoothed cotton fibers.

3. The perforations of claim 1 wherein said perforations are spaced around said outer periphery of said food-facing layer and said second layer, said third layer, and said fourth layer.

4. The perforations of claim 1 wherein said perforations prevent said food-facing layer and said second layer, said third layer, and said fourth layer from separating.

5. The perforations of claim 1 wherein said perforations bond said food-facing layer, said second layer, said third layer, said fourth layer, said vapor-impermeable layer, and said double-sided adhesive sheet, into an integral unit.

6. The vapor trap of claim 1 wherein said vapor trap protects the original flavor, crispness, texture, and appearance of said hot food.

7. The vapor trap of claim 1 wherein said vapor trap is capable of absorbing vaporized cooking oil.

8. The vapor trap of claim 1 wherein said vapor trap is approximately 120 mm in diameter.

9. The vapor trap of claim 1 wherein said vapor trap is 10 mm thick.

10. The vapor trap of claim 1 wherein said vapor trap is circular in shape.

* * * * *